May 6, 1924.
H. J. ROBINSON
SAFETY DEVICE FOR AUTOMOTIVE VEHICLES
Filed July 8, 1922
1,492,606
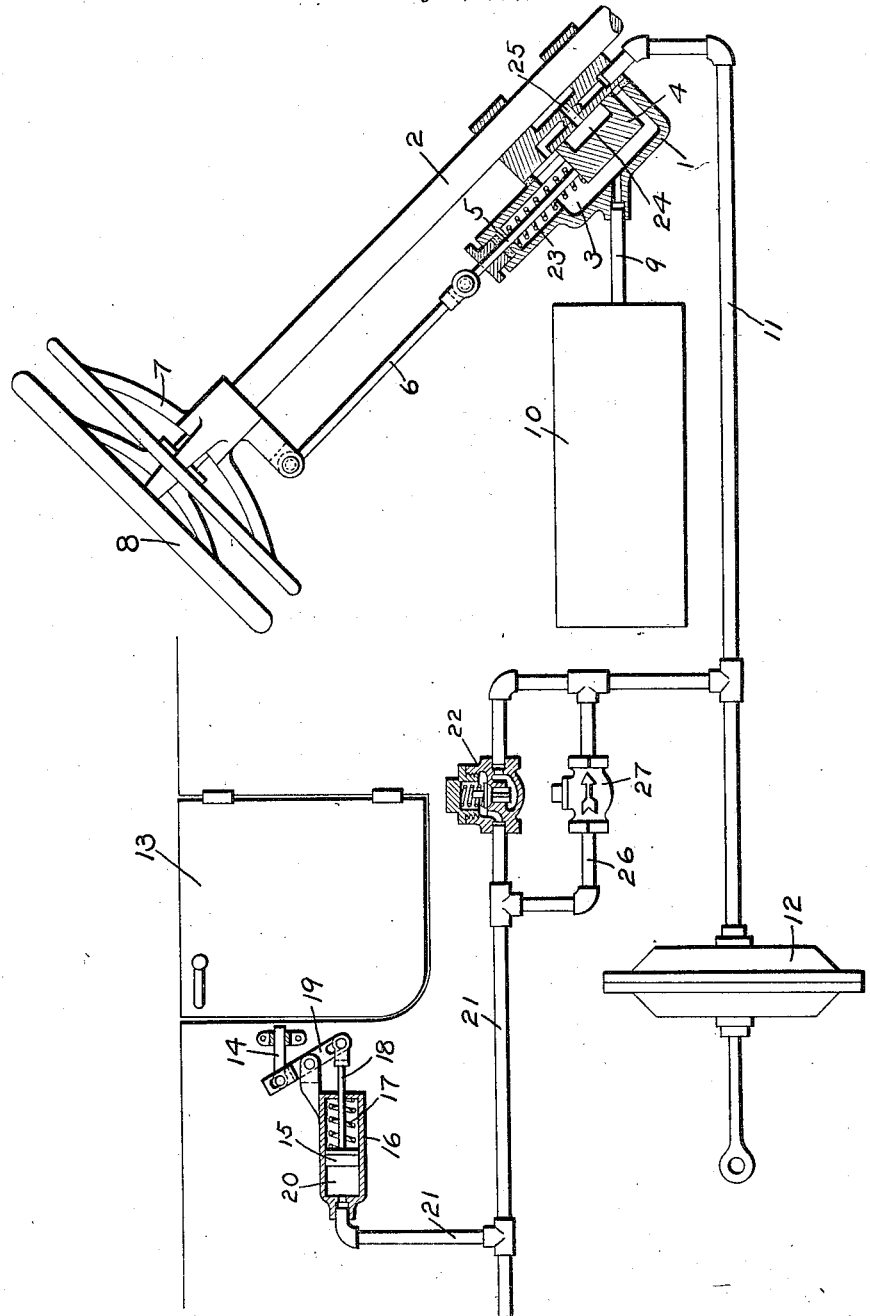
INVENTOR
HENRY J. ROBINSON
BY *Wm. M. Cady*
ATTORNEY Patented May 6, 1924.

1,492,606

UNITED STATES PATENT OFFICE.

HENRY J. ROBINSON, OF LAKE BALLINGER, WASHINGTON, ASSIGNOR TO THE WESTINGHOUSE AIR BRAKE COMPANY, OF WILMERDING, PENNSYLVANIA, A CORPORATION OF PENNSYLVANIA.

SAFETY DEVICE FOR AUTOMOTIVE VEHICLES.

Application filed July 8, 1922. Serial No. 573,635.

*To all whom it may concern:*

Be it known that I, HENRY J. ROBINSON, a citizen of the United States, residing at Lake Ballinger, in the county of Snohomish and State of Washington, have invented new and useful Improvements in Safety Devices for Automotive Vehicles, of which the following is a specification.

This invention relates to automotive vehicles and more particularly to a safety control device therefor.

One object of my invention is to provide a safety device for automotive vehicles adapted to apply the brakes when released by the operator, as in the case of the operator becoming incapacitated.

Another object is to provide means for normally locking the door or doors of an automotive vehicle and operated to unlock the door when released by the operator.

Another object of the invention is to provide means operable upon release by the operator for applying the brakes and unlocking the door of an automotive vehicle.

In the accompanying drawing, the single figure is a diagrammatic view, partly in section, of a safety control apparatus for an automotive vehicle embodying my invention.

According to a preferred embodiment of my invention, a brake controlling valve device 1 is associated with the steering post 2 of an automotive vehicle and may comprise a casing having a valve chamber 3 containing a slide valve 4. Attached to the valve 4 is a stem 5 which extends out of the casing and is pivotally connected to an operating rod 6. Slidably mounted on the post 2 is a hand wheel 7 which is arranged adjacent to the usual steering wheel 8 and the rod 6 is pivotally connected to said hand wheel 7.

The valve chamber 3 is connected by pipe 9 to source of fluid under pressure such as the reservoir 10 and the valve 4 controls the admission and release of fluid under pressure through pipe 11 to and from a diaphragm brake cylinder 12.

Associated with the door 13 of the automotive vehicle is a locking pin 14 for locking the door against opening, the operation of the pin being controlled by a piston 15 contained in a cylinder 16 and subject on one side to the pressure of a spring 17. The piston stem 18 is connected through a pivotally mounted rocker arm 19 with the locking pin 14 and the piston chamber 20 is connected by pipe 21 to the brake cylinder pipe 11.

Interposed in the pipe 21 is a weighted spring check valve 22 adapted to open and permit the flow of fluid under pressure to the door cylinder 16 when the brake cylinder pressure has been increased to a predetermined degree.

A spring 23 acts on the slide valve 4 and tends to shift the valve to its brake applying position.

In operation, when the operator pulls up on the hand wheel 7 with the hands grasping the steering wheel 8, the slide valve 4 will be moved to release position in which cavity 24 in the slide valve 4 connects pipe 11 with an exhaust port 25 and so long as the operator holds the hand wheel in this position while running along the road the brakes will remain released.

If the operator should let go the hand wheel for any reason, such as in case he becomes incapacitated, the spring 23 will promptly shift the valve 4 so as to close the exhaust port and uncover the passage leading to the brake cylinder pipe 11. Fluid under pressure will then be supplied from the reservoir 10 and the valve chamber 3 to effect an application of the brakes on the vehicle.

Fluid under pressure is also supplied from the pipe 11 to the pipe 21 and when the brake cylinder pressure has been increased sufficiently, the spring check valve 22 will open and permit the flow of fluid under pressure to the door cylinder 16. The piston 15 then operates to retract the locking pin 14 so as to release the door 13 and permit the same to be opened, as shown in the drawing.

The brakes may be released by pulling up the hand wheel 7, so that the slide valve 4 will be shifted to release position, in which cavity 24 connects the brake cylinder pipe 11 with exhaust port 25.

As the check valve 22 prevents back flow from the door cylinder 16, a by pass release pipe 26 having a check valve 27 may be provided around the check valve 22. The check valve 27 prevents flow of fluid to the door cylinder but opens to permit the release of fluid from the cylinder when the brakes are released, so that fluid is then released from piston 15, permitting the spring 17 to shift the locking pin 14 so as to lock the door 13.

Having now described my invention, what I claim as new and desire to secure by Letters Patent, is:—

1. The combination with a motor vehicle brake and a door for said vehicle, of means for locking said door and means operative upon applying the brakes for releasing said locking means.

2. The combination with a motor vehicle brake and a door for said vehicle, of means for locking said door and means operative upon releasing the brakes for operating said locking means to lock the door 3. The combination with a fluid pressure brake for a motor vehicle including a brake cylinder operated by fluid under pressure for applying the brakes, of a door for said motor vehicle and means for locking said door and operated by fluid supplied to the brake cylinder for releasing the door.

4. The combination with a fluid pressure brake for a motor vehicle including a brake cylinder operated by fluid under pressure for applying the brakes, of a vehicle door lock, a spring for yieldingly holding the door lock in its locked position, and a piston operated upon supplying fluid to the brake cylinder for releasing said lock.

5. The combination with a fluid pressure brake for a motor vehicle including a brake cylinder operated by fluid under pressure for applying the brakes, of a vehicle door lock, a spring, and a piston subject to the opposing pressures of the spring and said brake cylinder for controlling said lock.

6. The combination with a motor vehicle brake and a vehicle door locking device, of a manually operated member and means operative upon releasing said member for operating said locking device and applying the brakes.

7. The combination with a fluid pressure brake for a motor vehicle, of a door for said vehicle, a device for normally locking said door and operated upon supplying fluid to apply the brakes for releasing said door, a manually operated member, and means operated upon the release of said member for supplying fluid to apply the brakes.

8. The combination with a fluid pressure brake for an automotive vehicle including a brake cylinder, of vehicle door, a fluid pressure operated locking device for said door, and means operated at a predetermined pressure in the brake cylinder for supplying fluid to said locking device.

9. The combination with a fluid pressure brake for an automotive vehicle including a brake cylinder, of a vehicle door, a fluid pressure operated locking device for said door, and a spring loaded check valve operated upon a predetermined increase in brake cylinder pressure for supplying fluid under pressure to said locking device.

In testimony whereof I have hereunto set my hand.

HENRY J. ROBINSON.